2,212,132

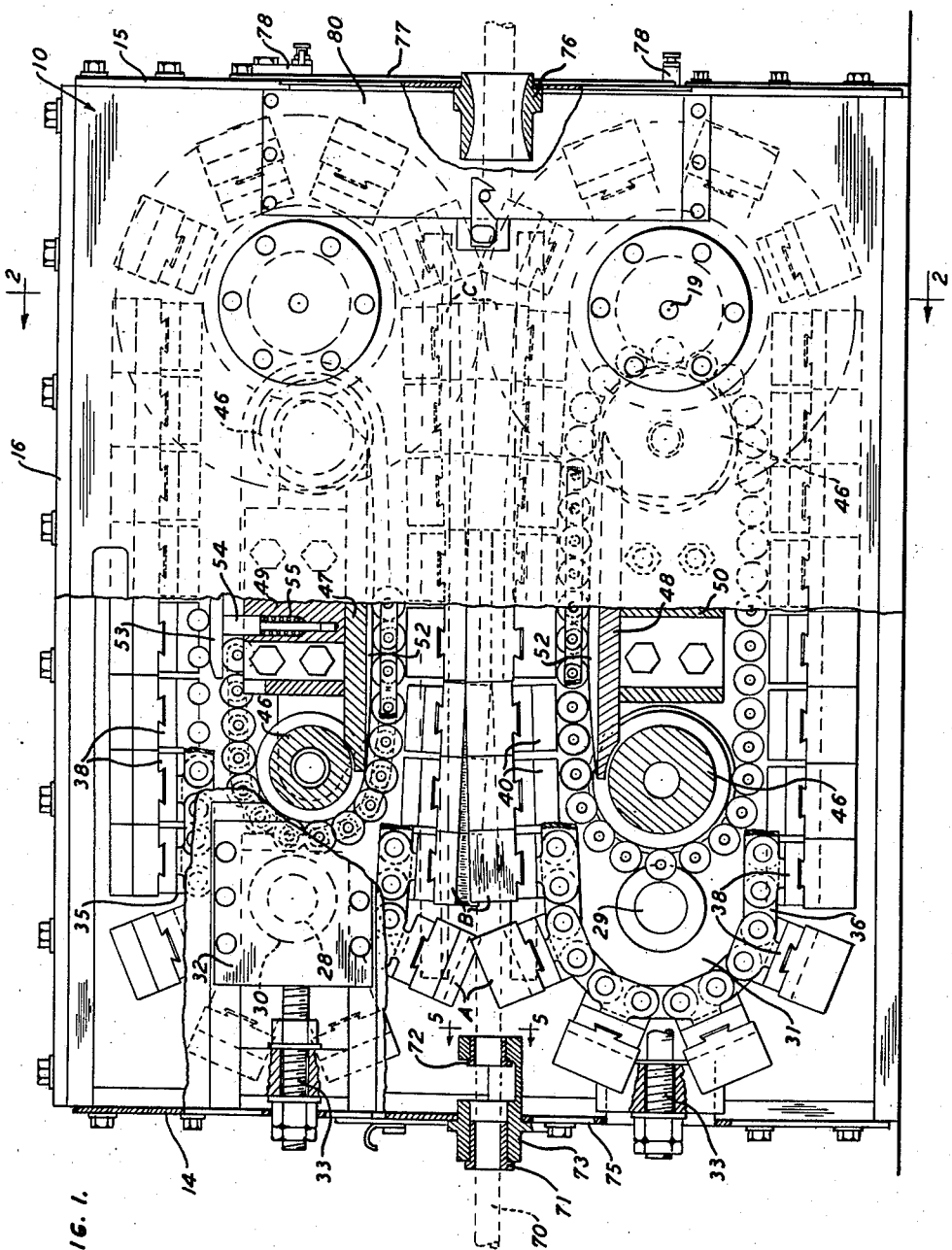

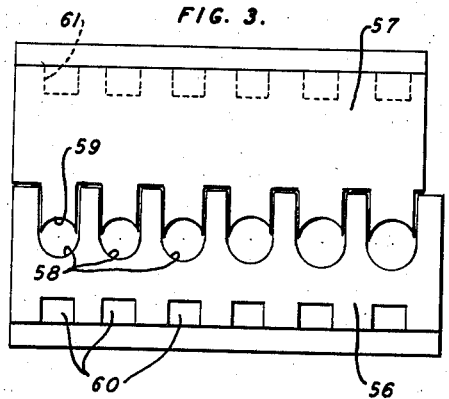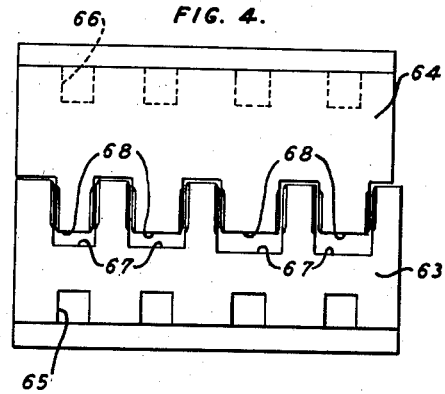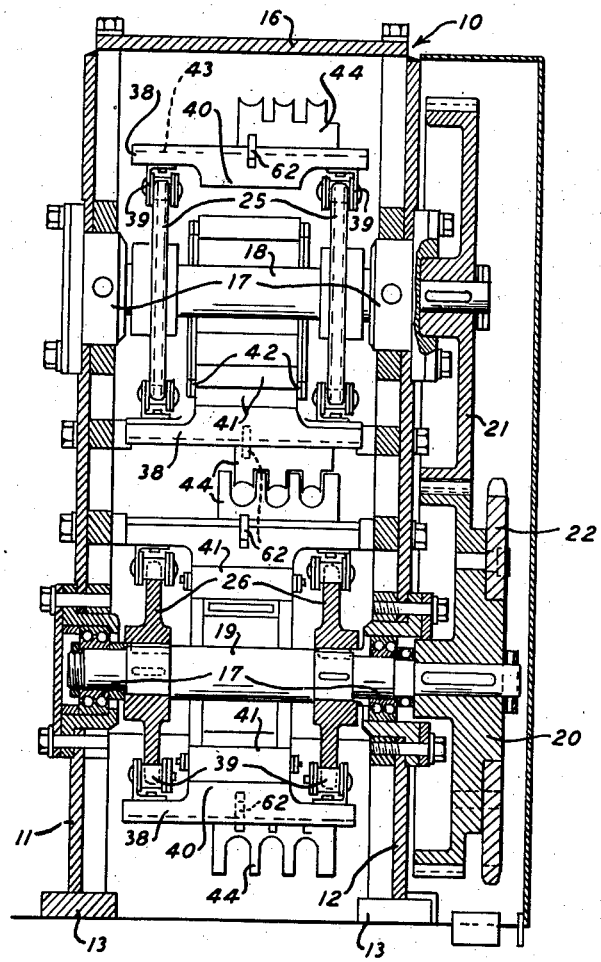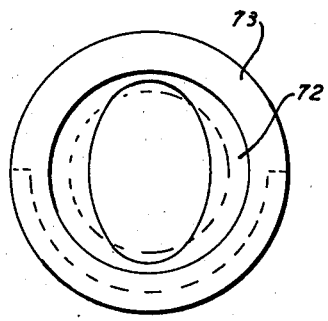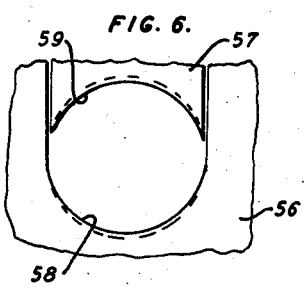
INVENTOR
W. B. SHEAR
BY E. R. Nowlan
ATTORNEY Patented Aug. 20, 1940

UNITED STATES PATENT OFFICE 2,212,132

METHOD OF AND APPARATUS FOR FORMING CABLES

Walter B. Shear, Newark, N. J., assignor to Western Electric Company, Incorporated, New York, N. Y., a corporation of New York Application November 30, 1937, Serial No. 177,319

18 Claims. (Cl. 57—138)

This invention relates to a method of and apparatus for forming cables and more particularly to a method of and apparatus for compressing covered electrical cables into predetermined shapes.

In the communications art, reference being made especially to switchboard assemblies, the increase in operators' positions and the use of different types of apparatus has created the necessity in some cases for switchboard cables being not only smaller in size with the same number or more conductors but of different cross-sectional contours.

An object of the present invention is to provide a more efficient method of and apparatus for compressing and forming electrical cables of various sizes and cross-sections.

With such and other objects in view, one embodiment of the invention contemplates an apparatus, by the aid of which the method may be practiced for forming electrical cables by moving a cable core longitudinally through a compressing means having driven diametrically opposed endless chains of intermeshing overlapping die blocks travelling in a guided continuous arc for cooperatively compressing the core into the cross-section desired, the chains being supported internally upon independently moving roller chains and each die block being adjustable transversely to selectively position differently sized cable channels in general alignment with the path of movement of the cable core.

Other objects and advantages will appear from the following detailed description when considered in conjunction with the accompanying drawings, in which Fig. 1 is a side elevational view of the apparatus, portions thereof being shown in section;

Fig. 2 is a vertical sectional view taken along the line 2—2 of Fig. 1;

Fig. 3 is an enlarged front elevational view of one form of die block;

Fig. 4 is an enlarged front elevational view of another form of die block;

Fig. 5 is an enlarged end elevational view taken along the line 5—5 of Fig. 1, and Fig. 6 is an enlarged fragmentary view of the die block shown in Fig. 3.

Referring now to the drawings which illustrate the apparatus by means of which the method may be practiced, numeral 10 indicates in general a housing formed of spaced vertically projecting side walls 11 and 12 mounted upon base plates 13, the latter being arranged to be secured to a suitable support for positioning the apparatus in relationship with a stranding machine for receiving the cable therefrom. Suitable end plates 14 and 15 and a top plate 16 are secured to the side walls 11 and 12 to complete the housing.

At one end of the housing (the right hand view in Fig. 1) are bearings 17 removably positioned in the side walls 11 and 12 for rotatably supporting the ends of sprocket shafts 18 and 19 (Fig. 2). The lower sprocket shaft 19 has keyed to an end thereof a gear 20 intermeshing with a gear 21, which is keyed to the outer end of the shaft 18, for operatively connecting the shafts 18 and 19 to drive them in opposite directions. The gear 20 is driven by means of a sprocket wheel 22 connected to a suitable power means not shown. Upon the shafts 18 and 19 are fixedly mounted sprocket wheels 25 and 26 respectively, the sprocket wheels of one shaft being spaced and disposed in general alignment with the sprocket wheels of the other shaft. At the opposite end of the frame 10 another pair of sprocket shafts 28 and 29 having sets of sprocket wheels 30 and 31 mounted thereupon in exactly the same manner as those shown in Fig. 2 have their ends journalled in bearings disposed in movable bearing blocks 31 so that the shafts 28 and 29 with their respective sprocket wheels may be moved relative to their associated shafts 18 and 19 respectively. This movement or adjustment is brought about by the aid of adjusting screws 33.

Upon the sprocket wheels 25 and 31 is mounted an endless chain 35 and a similar endless chain 36 being mounted upon the sprocket wheels 26 and 31. These endless chains are identical in construction, they having a plurality of die supporting elements 38 extending parallel to the sprocket shafts and mounted upon chain links 39, the latter being positioned to be engaged by the sprocket wheels. The die supports 38 have reduced portions 40 which project inwardly and are arranged to be engaged by rollers 41 of roller chains 42. The outer surface of each of the die supports 38 has a dovetail slot 43 therein for removably receiving a corresponding element of a die block 44. The dovetail connection between each die block 44 and its support 38 is of course merely one form of connection which may be used between these elements permitting relative movement thereof for the purpose hereinafter described.

The roller chains 42 for each set of endless chains 35 and 36 extend around rollers 46 as illustrated in Figs. 1 and 2. The rollers 41 of these roller chains pass between the die supports 38 of the endless chains 35 and 36 and fixed guides 47 and 48. The guides 47 and 48 are rigidly secured to embossed portions 49 and 50 of the side walls 11 and 12 and have roller engaging surfaces 52 formed with predetermined arcs to cause the die blocks, through the aid of the roller chains 42, to gradually move into forming position and gradually move out of such position without causing harm to the cable being formed. Resiliently supported bars 53 positioned one in engagement with each set of links 39 of the upper endless chain 35 support the upper portion of the chain while it is passing from the sprocket wheels 25 to the sprocket wheels 30. The supports for the bars 53 consist of downwardly projecting elements 54 of circular cross-section (only one being shown, see Fig. 1) slidably disposed in spaced apertures in the embossed portion 49 and having shoulders which rest upon springs 55 positioned in the apertures.

Referring now to Fig. 3 one set of intermeshing forming dies having sections 56 and 57 is illustrated, each section having a plurality of cable forming cavities varying in size to accommodate cables having varying numbers of strands. The cavities in the die section 56 are formed of parallel grooves 58, rather deeply cut, in the upper surface thereof, the grooves varying in size and the inner extremities being semi-circular in contour. The lower surface of the die section 57 is machined to form projecting die segments 59 variable in size to slidably enter the grooves 58 of the die section 56 and having concaved semi-circular lower surfaces, cooperating with the semi-circular portions of the grooves 58 to form circular die cavities. In general alignment with each of the grooves 58 of the section 56 are disposed latch receiving recesses 60. In the same arrangement latch receiving recesses 61 are disposed in the die section 57. The purpose of these recesses is to properly position the die sections 56 and 57 relative to their respective supports 38, this being accomplished by the aid of latches 62 pivotally carried by the supports 38 and urged into the desired recesses by means of springs not shown. With this construction the die sections may be adjusted to position any selected die cavity in general alignment with the path of the moving cable, which is to be formed, or the die sections may be removed entirely and another form of die may be used as, for example, that shown in Fig. 4.

The form of die shown in Fig. 4 is for forming flat-sided cables and is composed of die sections 63 and 64 having their respective latch receiving recesses 65 and 66 respectively. The die cavities in this form have flat forming walls 67 and 68 as compared to the semi-circular forming walls of the die cavities shown in Fig. 3. The die cavities in both forms have their centers in general alignment so that the apparatus may be conditioned to receive larger or smaller cables merely by adjustment of the die sections without requiring further adjustment in the apparatus to compensate for the variation in size of the cable being formed. The form of die sections shown in Fig. 2 is somewhat similar to that shown in Fig. 3 but with larger die cavities to accommodate larger cables than those required for the cavities shown in Fig. 3. The overall width of the die sections is approximately half the width of the die supports 38 of the endless chains 35 and 36 allowing sufficient space for the lateral movement of the dies to position the selected die cavity in alignment with the cable being formed.

The cable to be formed is indicated at 70 and may be received directly from a stranding machine and directed to dies 71 and 72 in a die holder 73. The dies 71 and 72 are removably secured in the die holder 73 and may be replaced by dies having selected apertures most suitable for the type of cable being formed. In forming cables with circular cross-sections using the forms of dies illustrated in Figs. 2 and 3 it is desirable to preform the cable with an oval cross-sectional contour as illustrated in Fig. 5. This may be accomplished by placing a die 72 with an oval aperture 74 in the die holder 73 for preforming the cable. The die holder 73 with its dies 71 and 72 is rigidly secured to a removable cover plate 75 so that by removing the cover plate, dies of any suitable type may be inserted in place. At the opposite end of the frame a cable guide 76 is secured to a removable cover plate 77, the latter being secured in place by latches 78. The cable guide 76 and the dies 71 and 72 determine the path of the cable through the apparatus, this path extending between the endless chains 35 and 36 to cause the die sections carried thereby to act upon the cable as it is advanced through the apparatus.

To condition the apparatus for operation the end plate 77 may be removed as well as a cover plate 80, removably disposed in the side wall 11, so that the operator may gain access to the endless chains 35 and 36 for assembling the desired die sections on the chains. A number of the die sections may be assembled while the endless chains are at one position and by causing intermittent movement of the chains all the die sections may be in the desired locations and in place. The cable is then threaded through the apparatus and the plates 77 and 80 again secured in their proper positions.

The operation of the apparatus is as follows: Rotation is imparted to the sprocket wheel 22 which rotates the gear 20 with the shaft 19 in a clockwise direction, viewing Fig. 1. The rotation of the shaft 19 in this direction causes the upper portion of the endless chain 36 with its die sections to move to the right with the cable 70. The upper chain 35 with its die section is moved in just the opposite direction due to the operative connection of the gear 21 with the gear 20 causing a lower portion of the chain 35 to move in unison with the upper portion of the chain 36. This unitary movement of the chains 35 and 36 causes each die section carried by the chain 36 to register with its associated die section carried by the upper chain 35. Before the die sections are moved into engagement with the strands forming the cable 70 they have arrived at a position where they will engage the rollers 41 of the roller chains 40 to be guided through arcs causing gradual movement of the die sections toward each other and away from each other as they move into and out of forming position. This gradual movement of the die sections toward the cable to compress it and away from the cable to free the die sections therefrom is brought about by the guide plates 47 and 48. The rollers 41 of the roller chain 42 provide substantially frictionless associations between the stationary guides 47 and 48 and their respective chains 35 and 36. The rollers 41 are smaller in diameter than the width of the die supports 38 so that at all times more than one roller will be in engagement with each of its supports during the forming operation to prevent rocking of the supports and the die sections carried thereby.

It will be observed, by viewing Fig. 1, that the sprocket wheels 30 and 31 are positioned away from the advancing cable sufficient distances to swing the die sections from the outer lines to the inner lines without the forward edges of the die cavities touching the cable. The die sections are moved at a faster rate of speed around their sprocket wheels than they travel between their sprocket wheels and if the forward edges of the sprocket wheels and if the forward edges of the die cavities of the die sections in position A should engage the cable, that portion of the cable between the die sections at position A and the die sections at position B would be damaged and a portion if not all of the insulation stripped therefrom. Therefore, the die sections are moved into position B before they are moved into engagement with the cable. Furthermore, there is no relative movement of the die sections in each group from position B to position C inclusive and even at these positions the surfaces forming the die cavities are free from the cable.

With the form of die section illustrated in Figs. 2 and 3, the cable is preformed by passing through a die 72 having a substantially oval aperture so that when the cable passes between the die sections carried by the chains 35 and 36, the conductors forming the cable will not become pinched or damaged between the die sections as might occur if the conductors forming the cable were directed through the forming dies of the chains in a rather loose manner. By viewing Fig. 6 it will be observed that in forming round cables the curvature of the cable at the point of highest pressure will not be exactly symmetrical but will be somewhat flattened, so that when the cable is released or freed from the forming dies and allowed to expand it will assume almost a perfect circular cross-section.

The embodiment of the invention herein disclosed is illustrative only and may be departed from and modified without departing from the spirit and scope of the invention as pointed out in and limited only by the appended claims.

What is claimed is:

1. In a cable forming apparatus, diametrically opposed endless chains, means for imparting movement to said chains to cause their adjacent portions to move in the direction of a cable being formed, intermeshing die elements having cable receiving cavities of varying sizes, and means carried by said chains for movably supporting said die elements to selectively position the desired cavities in operating positions.

2. In a cable forming apparatus, diametrically opposed endless chains, means for imparting movement to said chains to cause their adjacent portions to move in the direction of a cable to be formed, intermeshing die blocks carried by said chains, and means for guiding said chains to cause movement of the die blocks of each chain toward and away from the cable without moving the die blocks of each chain relative to each other to compress the cable.

3. In a cable forming apparatus, diametrically opposed endless chains, means for imparting movement to said chains to cause their adjacent portions to move in the direction of a cable to be formed, intermeshing die blocks carried by said chains, means for guiding said chains to cause said die blocks to move toward the cable without relative movement to each other until a maximum pressure has been applied to the cable, and separate substantially frictionless means disposed between said guiding means and said chains and moved by said chains.

4. In a cable forming apparatus, means for advancing a cable to be formed, and means movable with the cable in a continuous arcuate path for applying increasing pressure thereto to compress the cable.

5. In a cable forming apparatus, means for advancing a cable to be formed, and means movable with the cable in a continuous arcuate path for applying increasing pressure thereto for forming the cable with flat sides.

6. In a cable forming apparatus, intermeshing forming elements having arcuate shaped cable receiving cavities, means for moving said elements substantially perpendicularly toward each other for forming a cable, and means in advance of said forming elements for preforming a cable to a thickness less than the diameter of the cavities of said elements.

7. In a cable forming apparatus, diametrically opposed endless chains, supports carried by said chains, sets of cable forming dies having cavities varying in size for different sized cables to be formed, portions of said dies being movably carried by said supports of one of said chains and the associated portions of said dies being movably carried by said supports of the other chain, means for imparting movement to said chains to cause the adjacent portions to move with the cable to be formed, and means for securing each of said die sections in any selected position relative to the path of movement to the cable.

8. A method of forming cables comprising advancing a cable, applying a continuously and gradually increasing pressure to the cable during the advancement thereof to compress the cable, and subsequently decreasing the pressure gradually.

9. A method of forming cables comprising advancing a cable, preforming the cable to cause the cable to substantially flatten it, applying a gradually increasing pressure to the cable at its greatest width to compress the cable, and decreasing the pressure gradually after a predetermined pressure has been applied.

10. A method of forming cables comprising advancing a cable, and applying a pressure gradually through an arcuate path to the cable during the advancement of the cable to compress the cable.

11. A method of forming cables comprising advancing a cable, and applying a gradually increasing and decreasing pressure through an arcuate path during the advancing of the cable to compress the cable.

12. In a cable forming apparatus, forming elements having cable engaging surfaces, means for moving said forming elements with a cable being formed, and means to cause movement of the elements to cause the cable engaging surfaces to form an arc extending from a position out of engagement with the cable, through a maximum pressure position and to a position out of engagement with the cable.

13. In a cable forming apparatus, forming elements, means for moving said forming elements with the cables being formed, and means for causing movement of a group of said elements through continuous arcs into, during and out of forming positions.

14. In a cable forming apparatus, diametrically opposed endless chains, die blocks carried by the chains, means for imparting movement to the chains to cause their adjacent portions to move the elements carried thereby in the direction of a cable to be formed and through arcs to compress the cable, and means to guide the elements into the arcs prior to their engagement with the cable.

15. In a cable forming apparatus, diametrically opposed endless chains, die blocks carried by the chains, means for imparting movement to the chains to cause their adjacent portions to move the elements carried thereby in the direction of a cable to be formed and through arcs to compress the cable, and means to guide the elements into the arcs prior to their engagement with the cable and move the elements free of the cable prior to their movement out of the arcs.

16. In a cable forming apparatus, diametrically opposed chains, cable forming elements having a plurality of cable forming portions, supports for the elements carried by the chains, means for each support to adjustably locate its respective element to position a desired forming portion thereof to engage a cable to be compressed, and means to move the chains to move the elements to compress the cable.

17. In a cable forming apparatus, diametrically opposed chains, cable forming elements having a plurality of cable forming portions variable in contour for various types of cables, supports for the elements carried by the chains, means for each support to adjustably locate its respective element to position a desired forming portion thereof to engage a cable to be compressed, and means to move the chains to move the elements to compress the cable.

18. In a cable forming apparatus, diametrically opposed chains, cable forming elements, supports for the elements carried by the chains, a guide for each chain having an arcuate surface, means to move the chains, and a series of rollers for each chain movable therewith between the supports and the guides to cause movement of the elements continuously through arcs to compress the cable from positions free of the cable through maximum pressure positions to positions free of the cable.

WALTER B. SHEAR.